(12) United States Patent
Um et al.

(10) Patent No.: US 12,344,487 B2
(45) Date of Patent: Jul. 1, 2025

(54) STAGE-STACKING LIFT

(71) Applicant: LG Energy Solution, Ltd., Seoul (KR)

(72) Inventors: Jae Hyung Um, Daejeon (KR); Bong Cheol Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/570,298

(22) PCT Filed: Oct. 13, 2022

(86) PCT No.: PCT/KR2022/015498
§ 371 (c)(1),
(2) Date: Dec. 14, 2023

(87) PCT Pub. No.: WO2023/063745
PCT Pub. Date: Apr. 20, 2023

(65) Prior Publication Data
US 2024/0270515 A1    Aug. 15, 2024

(30) Foreign Application Priority Data

Oct. 13, 2021  (KR) ........................ 10-2021-0136138

(51) Int. Cl.
*B65G 57/30*    (2006.01)
*B66F 7/02*    (2006.01)

(52) U.S. Cl.
CPC .......... *B65G 57/303* (2013.01); *B65G 57/301* (2013.01); *B65G 2201/0258* (2013.01); *B66F 7/02* (2013.01)

(58) Field of Classification Search
CPC .. B65G 1/0407; B65G 1/0471; B65G 1/0464; B65G 57/302; B65G 57/303; B65G 59/06; B65G 59/061; B65G 59/062; B65G 59/063; B65G 59/101; B65G 57/03; B65G 57/24; B65G 57/00; B65G 57/22;
(Continued)

(56) References Cited

U.S. PATENT DOCUMENTS 3,172,545 A * 3/1965 Schmid ................ B65G 59/062
414/795.8
5,868,545 A * 2/1999 Kasai ..................... B65G 65/00
414/331.15
(Continued)

FOREIGN PATENT DOCUMENTS

CN    106115275 A    11/2016
CN    108382865 A    8/2018
(Continued)

OTHER PUBLICATIONS

International Search Report for PCT/KR2022/015498 mailed Jan. 19, 2023. 3 pages.
(Continued)

*Primary Examiner* — Gregory W Adams
(74) *Attorney, Agent, or Firm* — Lerner David LLP

(57) ABSTRACT

A stage-stacking lift according to the present invention includes a lift unit and a stage-stacking unit mounted in the lift unit. The stage-stacking unit stacks a tray, in which accommodation targets are accommodated, in multiple stages, and the lift unit elevates the tray stacked in multiple stages.

10 Claims, 11 Drawing Sheets

(58) Field of Classification Search
CPC ...... B65G 59/02; B65G 1/1373; B65G 60/00;
B65G 61/00; B65G 59/023
USPC .......... 414/788.1, 788.2, 794.9, 795.2, 795.3
See application file for complete search history.

(56) References Cited

U.S. PATENT DOCUMENTS

| | | | |
|---|---|---|---|
| 6,283,703 B1 * | 9/2001 | Dowling | H01L 21/67333 |
| | | | 414/788.7 |
| 9,845,208 B2 | 12/2017 | Lindbo | |
| 10,300,610 B1 * | 5/2019 | La Rovere | B65G 1/14 |
| 10,464,786 B2 * | 11/2019 | Miyoshi | B66C 13/23 |
| 2013/0166062 A1 | 6/2013 | Casey et al. | |
| 2020/0079602 A1 * | 3/2020 | Kihlström | B65G 67/08 |
| 2020/0087064 A1 * | 3/2020 | Hendrix | B65G 1/0428 |
| 2020/0207546 A1 * | 7/2020 | Borders | B65G 67/02 |
| 2020/0231420 A1 | 7/2020 | Ueda et al. | |
| 2023/0033724 A1 | 2/2023 | Ueda et al. | |

FOREIGN PATENT DOCUMENTS

| | | |
|---|---|---|
| DE | 4203823 A1 | 8/1993 |
| JP | S5382989 U | 7/1978 |
| JP | S5917421 A | 1/1984 |
| JP | S61203009 A | 9/1986 |
| JP | H03072528 U | 7/1991 |
| JP | H05004720 A | 1/1993 |
| JP | H05046807 U | 6/1993 |
| JP | H05162855 A | 6/1993 |
| JP | H05082910 U | 11/1993 |
| JP | H0664752 A | 3/1994 |
| JP | H07277508 A | 10/1995 |
| JP | 2001019163 A | 1/2001 |
| JP | 2002249225 A | 9/2002 |
| JP | 3398502 B2 | 4/2003 |
| JP | 3409545 B2 | 5/2003 |
| JP | 2004067304 A | 3/2004 |
| JP | 2006341968 A | 12/2006 |
| JP | 2007137550 A | 6/2007 |
| JP | 2008303020 A | 12/2008 |
| JP | 5120869 B2 | 1/2013 |
| JP | 6679375 B2 | 4/2020 |
| JP | 2021019535 A | 2/2021 |
| JP | 6870517 B2 | 5/2021 |
| JP | 2021073153 A | 5/2021 |
| JP | 2021123472 A | 8/2021 |
| KR | 100541518 B1 | 1/2006 |
| KR | 200410214 Y1 | 3/2006 |
| KR | 20100021195 A | 2/2010 |
| KR | 20130111905 A | 10/2013 |
| KR | 20150065237 A | 6/2015 |
| KR | 20200033272 A | 3/2020 |
| WO | 2013096498 A1 | 6/2013 |

OTHER PUBLICATIONS

Extended European Search Report including Written Opinion for Application No. 22881372.1 dated Sep. 18, 2024, pp. 1-8.

* cited by examiner

STAGE-STACKING LIFT

CROSS-REFERENCE TO RELATED APPLICATIONS

This application is a national stage entry under 35 U.S.C. § 371 of International Application No. PCT/KR2022/015498, filed on Oct. 13, 2022, which claims priority to Korean Patent Application No. 10-2021-0136138, filed on Oct. 13, 2021, the disclosures of which are hereby incorporated by reference in their entireties.

Technical Field

The present disclosure relates to a stage-stacking lift.

BACKGROUND ART

Stage-stacking is necessary in order to improve transportation efficiency, but there is a problem that a lift and a stage-stacking unit are separately provided to cause low space efficiency.

There is also a problem that a case, in which the lift and the stage-stacking unit are not separately installable in a space with a limited layout, occurs.

DISCLOSURE OF THE INVENTION

Technical Problem

One aspect of the present invention is to provide a stage-stacking lift that may minimize a distribution equipment arrangement space.

Technical Solution

A stage-stacking lift according to an embodiment of the present invention may include a lift unit and a stage-stacking unit mounted in the lift unit. The stage-stacking unit may stack a tray, in which accommodation targets are accommodated, in multiple stages, and the lift unit may elevate the tray stacked in multiple stages.

Advantageous Effects

According to the present invention, the stage-stacking unit may be configured to be mountable in the lift unit and thus, minimize the distribution equipment arrangement space. In addition, the operations of stacking and lifting the trays may become easier and the operating speed may increase.

MODE FOR CARRYING OUT THE INVENTION

Figure 1:
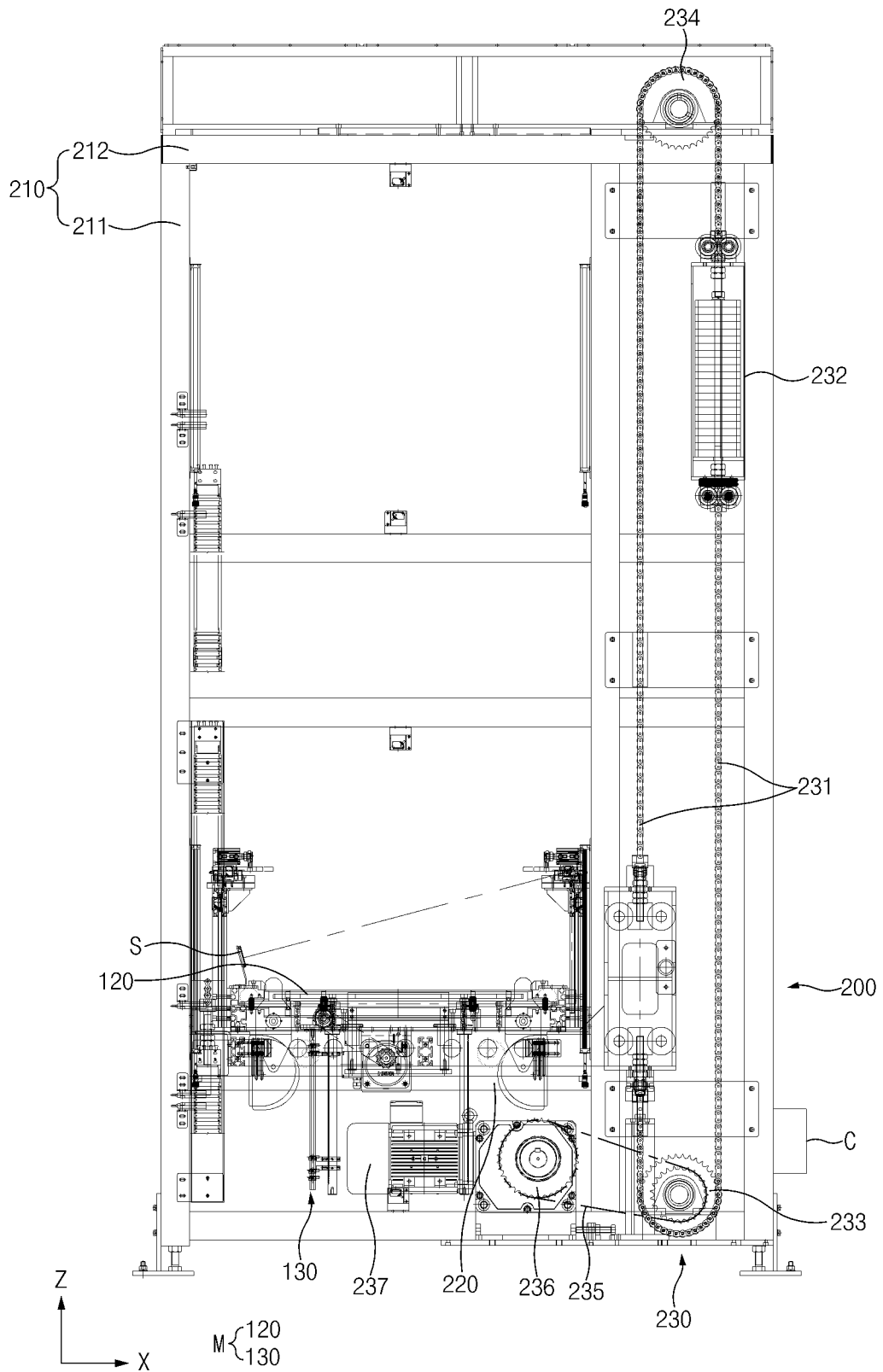
FIG. 1 is a front view exemplarily illustrating a stage-stacking lift according to an embodiment of the present invention.

The above and other aspects, features and other advantages of the present invention will be more clearly understood from the following detailed description taken in conjunction with the accompanying drawings. Note that like elements are designated by like reference numerals as far as possible even if they are shown in different drawings. The present invention may be embodied in different forms and should not be construed as limited to the embodiments set forth herein. Moreover, detailed descriptions related to well-known art will be ruled out in order not to unnecessarily obscure subject matters of the present invention.

FIG. 1 is a front view illustrating a stage-stacking lift according to an embodiment of the present invention. Here, a horizontally movable unit is omitted in FIG. 1.

Referring to FIG. 1, a stage-stacking lift 1 according to an embodiment of the present invention includes a lift unit 200 and a stage-stacking unit 100 mounted in the lift unit 200. The stage-stacking unit 100 stacks a tray 10 in multiple stages, and the lift unit 200 elevates the tray 10 stacked in multiple stages. In addition, the stage-stacking lift 1 according to an embodiment of the present invention may further include the horizontally movable unit that moves the tray 10 in a horizontal direction, a controller C that controls each of devices, and a tray detection sensor that detects the tray 10.

Figure 2:
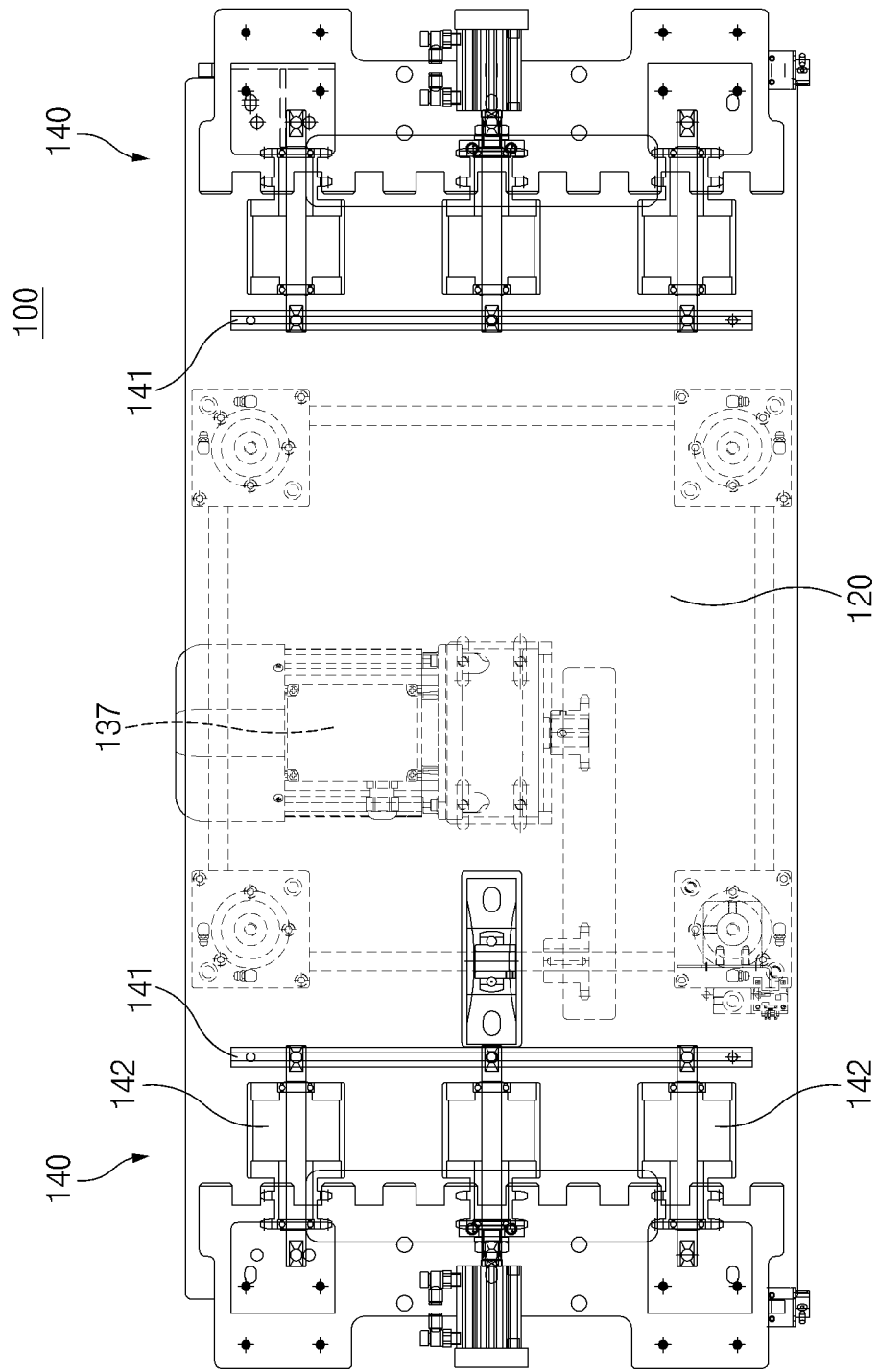
FIG. 2 is a plan view of a stage-stacking unit in a stage-stacking lift according to an embodiment of the present invention.
Figure 3:
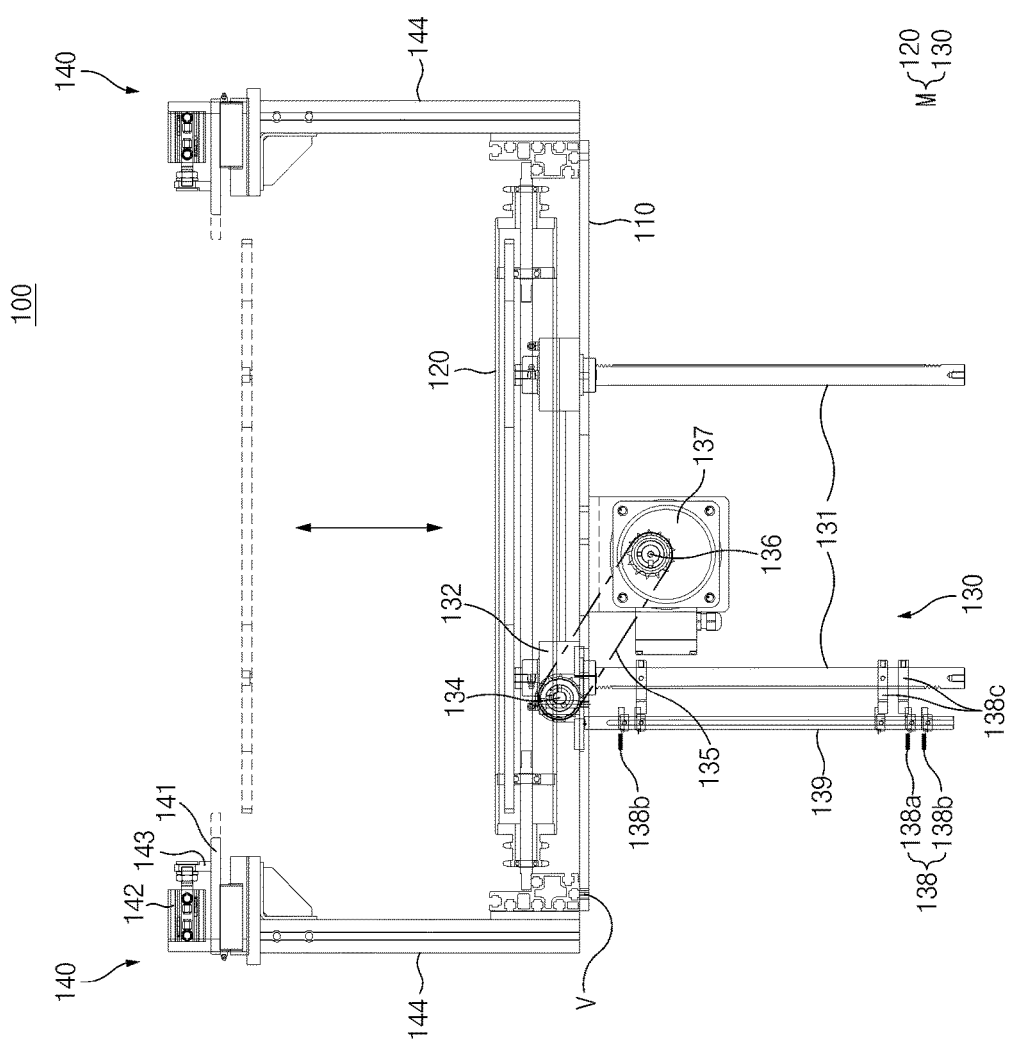
FIG. 3 is a front view of a stage-stacking unit in a stage-stacking lift according to an embodiment of the present invention.

FIG. 2 is a plan view of a stage-stacking unit in a stage-stacking lift according to an embodiment of the present invention. FIG. 3 is a front view of a stage-stacking unit in a stage-stacking lift according to an embodiment of the present invention.

In more detail, referring to FIG. 1 to 3, the stage-stacking unit 100 may stack the tray 10 in multiple stages, which is mounted in the lift unit 200 and in which accommodation targets are accommodated. Here, the accommodation targets may be, for example, multiple secondary batteries. Here, for example, the stage-stacking unit 100 may stack the tray 10 in two stages.

The stage-stacking unit 100 may include a Z-axis movable part M, which moves the tray 10 in a Z-axis direction that is a vertical direction, and a position fixing part 140 which fixes a position of the tray 10 that has moved vertically. In addition, the stage-stacking unit 100 may further include a height detection sensor 138, and a stage-stacking frame 110 that supports each of components of the stage-stacking unit 100. Here, the Z-axis movable part M, the position fixing part 140, and the height detection sensor 138 may be supported by the stage-stacking frame 110.

Referring to FIG. 3, the Z-axis movable part M may include a support stage 120 that supports a lower portion of the tray 10, and a vertically movable means 130 that moves the support stage 120 vertically. When the tray 10 is disposed at an upper portion of the support stage 120 through the Z-axis movable part M, the support stage 120 may move the tray 10 upward while moving upward.

The vertically movable means 130 may vertically move multiple movable rods 131, which support a lower portion of the support stage 120, to move the support stage 120 vertically. Here, for example, a moving method using an actuator 142 or a moving method using a rack and pinion may be used as the method of vertically moving the movable rods 131. However, the present invention is not necessarily limited thereto, and various methods of vertically moving the movable rods 131 may be used. Here, in the moving method using the rack and pinion, for example, a rack screw part may be provided on outer circumference of each of the movable rods 131, and the rack screw part may be engaged with a pinion gear 134 so that the movable rod 131 may move vertically according to rotation of the pinion gear 134. Here, the pinion gear 134 may be connected to a driving gear 136 through a power transmission means 135 and receive torque, and the driving gear 136 may be coupled to a rotary shaft of a driving motor 137 and rotate by the driving motor 137. Here, the power transmission means 135 may be a belt or a chain.

The height detection sensor 138 may detect the height of the support stage 120.

In addition, the height detection sensor 138 may detect a moving position of the movable rod 131, which supports the lower portion of the support stage 120, so as to detect the height of the support stage 120.

Moreover, the height detection sensor 138 may be mounted in a sensor rod 139, which extends downward from the stage-stacking frame 110, and disposed at a position spaced a predetermined distance from the movable rod 131 in a lateral direction.

And the height detection sensor 138 may include a Z-axis origin sensor 138a, and multiple Z-axis over sensors 138b disposed above and below the Z-axis origin sensor 138a. Here, the height detection sensor 138 may detect the height of a detection terminal 138c disposed on the outer circumference of the movable rod 131 so as to detect the moving position of the movable rod 131. A position of the detection terminal 138c, which is detected through the Z-axis origin sensor 138a and the Z-axis over sensors 138b, may be detected to detect the height of the support stage 120. Here, as the controller C to be described later controls the vertically movable means 130 by detecting the position of the movable rod 131 through the height detection sensor 138, the vertical movement of the support stage 120 may be controlled.

The position fixing part 140 may include a fitting bar 141, which has an end fitted into a groove 10a defined in a side surface of the tray 10, and the actuator 142 which moves the fitting bar 141 forward and backward with respect to a Y-axis. Here, the position fixing part 140 may further include a connecting bar 143 that connects the actuator 142 and the fitting bar 141 to each other.

Here, when the tray 10 moves upward to a predetermined height, the fitting bar 141 may be fitted into the groove 10a defined in the side surface of the tray 10, and support the tray 10 so as to fix the position of the tray 10. That is, the actuator 142 may operate to move the fitting bar 141 through the connecting bar 143, and the fitting bar 141 may be fitted into the groove 10a defined in the side surface of the tray 10 so as to fix the height of the tray 10.

In addition, the position fixing part 140 may be disposed at each of both sides of the tray 10 so as to support each of the both sides of the tray 10 and fix the position thereof. Here, the position fixing part 140 may be disposed at each of the both sides of the tray 10 in a Y-axis direction. And the fitting bar 141 may have a shape extending in the form of a bar in an X-axis direction. Here, the fitting bar 141 may have, for example, a rectangular prism shape.

Meanwhile, the position fixing part 140 may further include a fixing part frame 144 that supports the actuator 142 and the fitting bar 141. Here, the actuator 142 and the fitting bar 141 may be mounted in an upper portion of the fixing part frame 144. And the fixing part frame 110 may have a lower portion mounted in the stage-stacking frame 110.

Figure 4:
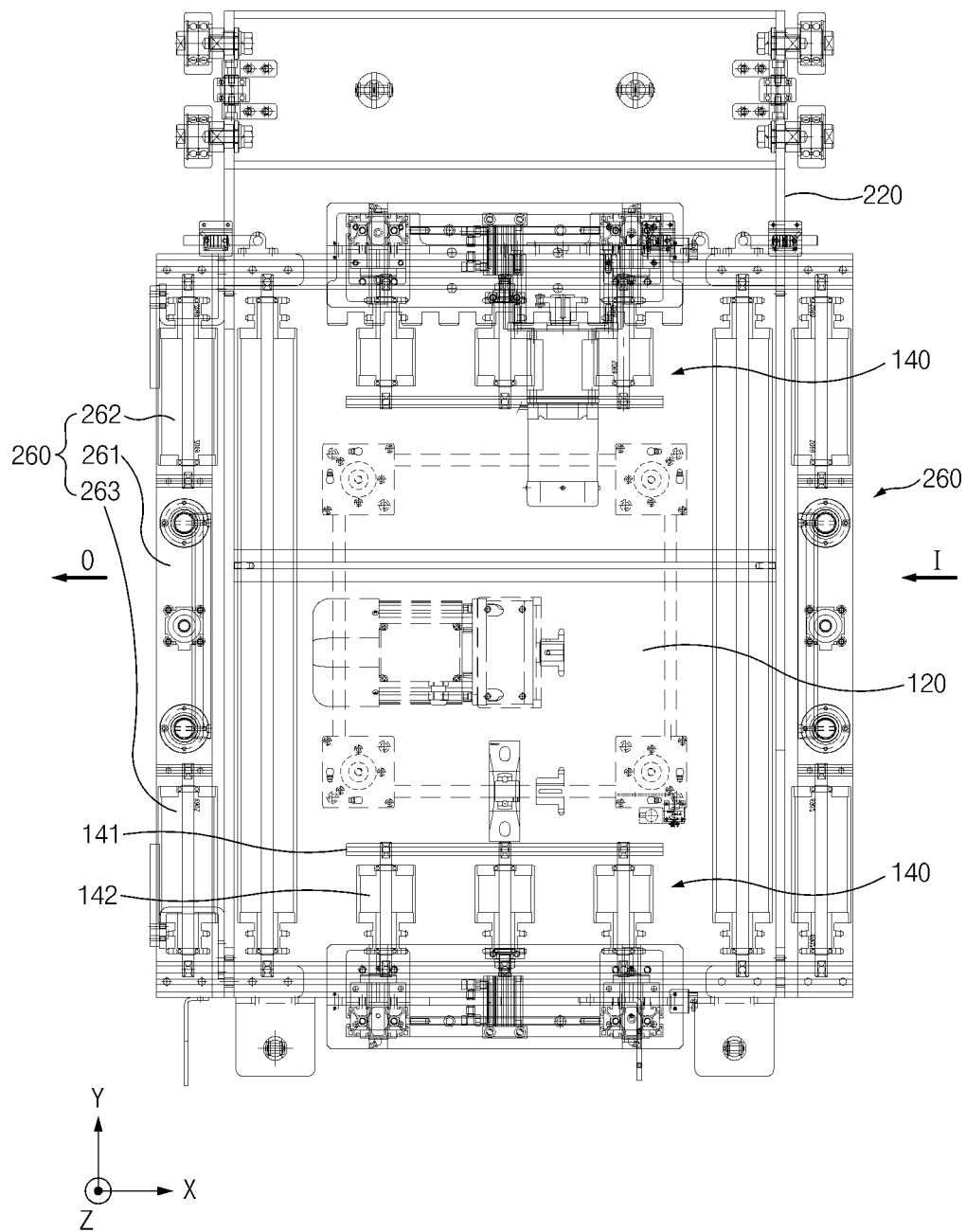
FIG. 4 is a plan view illustrating a stage-stacking unit and a lift unit in a stage-stacking lift according to an embodiment of the present invention.
Figure 5:
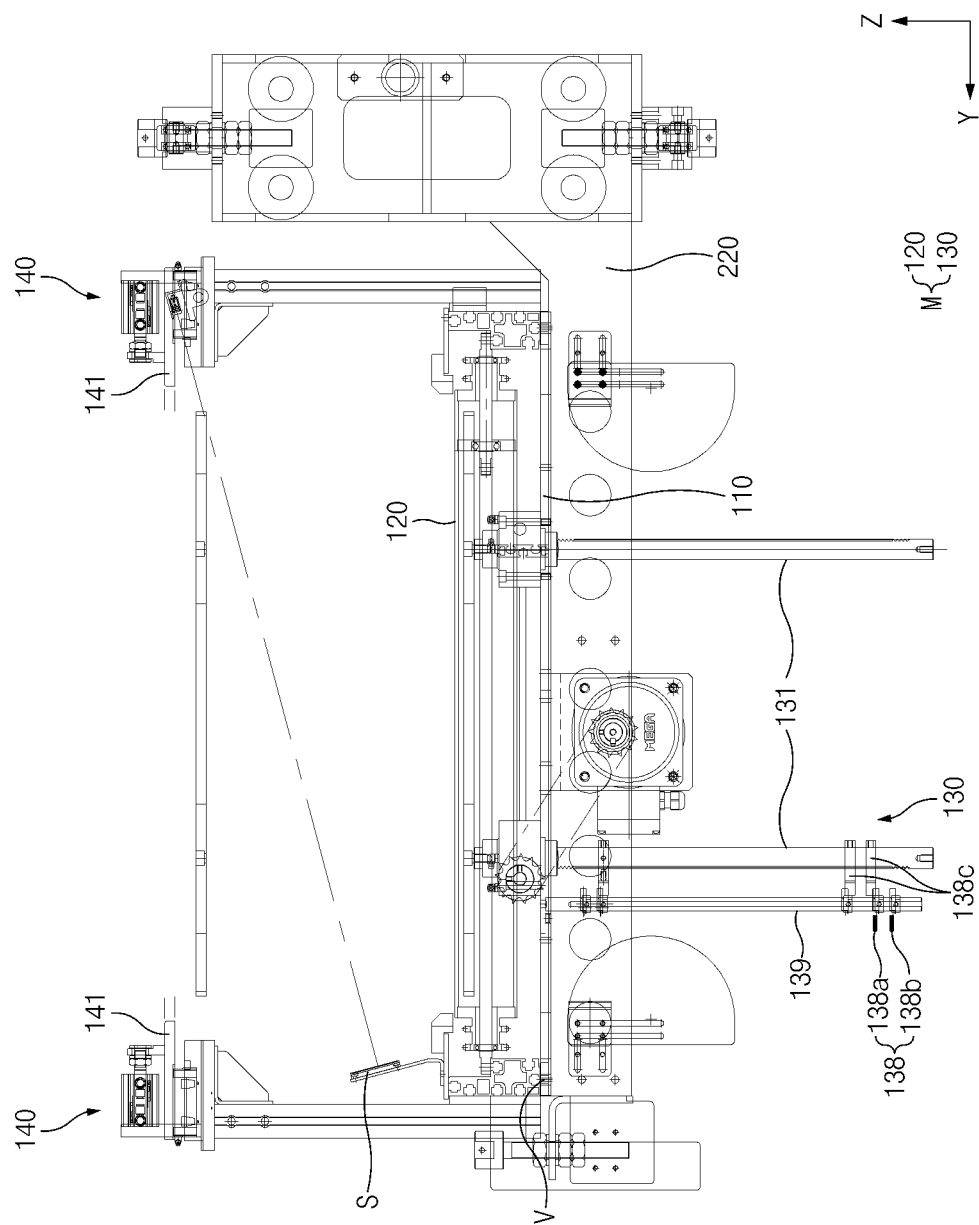
FIG. 5 is a front view illustrating a stage-stacking unit and a lift unit in a stage-stacking lift according to an embodiment of the present invention.

FIG. 4 is a plan view illustrating a stage-stacking unit and a lift unit in a stage-stacking lift according to an embodiment of the present invention. FIG. 5 is a front view illustrating a stage-stacking unit and a lift unit in a stage-stacking lift according to an embodiment of the present invention.

Referring to FIGS. 1, 4, and 5, the lift unit 200 may elevate the tray 10 stacked in multiple stages through the stage-stacking unit 100. Here, the lift unit 200 may elevate the tray 10 stacked in the stage-stacking unit 100 by elevating the stage-stacking unit 100.

In addition, the lift unit 200 may include a mounting stage 220 in which the stage-stacking unit 100 is mounted, and a lift means 230 that moves the mounting stage 220 vertically. When the mounting stage 220 moves upward through the lift means 230, the tray 10 stacked in the stage-stacking unit 100 may move upward. And the lift unit 200 may further include a stopper part 260 that prevents dropping of the tray.

Meanwhile, the lift unit 200 may further include a lift frame 210, and the lift frame 210 may include multiple vertical frames 211 and horizontal frames 212. The mounting stage 220 may move slidably along the vertical frames 211 through the lift means 230.

The lift means 230 includes a lift chain 231 to which the mounting stage 220 is coupled, a first chain gear 233 and a second chain gear 234 to which both upper and lower sides of the lift chain 231 are coupled, respectively, a rotating part that rotates the first chain gear 233. Here, the rotating part may include a revolving chain 235 having one side connected to the first chain gear 233, a driving chain gear 236 connected to the other side of the revolving chain 235, and a lift motor 237 that rotates the driving chain gear 236. Here, the lift motor 237 and the driving chain gear 236 may be connected to each other at a right angle, and various methods may be applied in connecting the lift motor 237 and the driving chain gear 236 to each other at a right angle. For example, a connecting method such as a bevel gear connection, may be used, but the present invention is not necessarily limited thereto.

And, in the lift means 230, when the lift motor 237 operates to rotate the driving chain gear 236 in one direction, the revolving chain 235 may revolve to move the mounting stage 220 upward. Accordingly, the stage-stacking unit 100 mounted in the mounting stage 220 may move upward, and the tray 10 stacked in multiple stages in the stage-stacking unit 100 may be lifted upward. Meanwhile, when the lift motor 237 rotates the driving chain gear 236 in the other direction, the mounting stage 220 may move downward.

Moreover, the lift unit 230 may further include a weight 232 coupled to the lift chain 221. Here, the lift chain 231 may have a first portion to which the mounting stage 220 is fixed, and a second portion to which the weight 232 is fixed.

The weight 232 may have a weight equal or similar to the sum of the weight of the mounting stage 220 and the weight of the stage-stacking unit 100 mounted in the mounting stage 220. Here, for example, a difference between the weight of the weight 232 and the sum of the weight of the mounting stage 220 and the weight of the stage-stacking unit 100 mounted in the mounting stage 220 may be 10% or less. Here, more specifically, for example, the difference between the weight of the weight 232 and the sum of the weight of the mounting stage 220 and the weight of the stage-stacking unit 100 mounted in the mounting stage 220 may be 10% or less, and accordingly, the mounting stage 220 in which the stage-stacking unit 100 is mounted may move vertically even with a small force.

Meanwhile, the stage-stacking unit 100 may be bolt-coupled to the mounting stage 220 through a bolt V. Here, the stage-stacking frame 110, which supports the components of the stage-stacking unit 100, may be screw-coupled and fixed to the mounting stage 220 through the bolt V.

The stopper part 260 is provided in each of front and rear of the support stage 120 in order to prevent the dropping of the tray 10 when the tray 10 is loaded on the support stage 120.

That is, the stopper part 260 may be disposed at each of a loading direction I side and an unloading direction O side with respect to the support stage 120 in a direction in which the tray 10 is loaded on the support stage 120, so as to prevent the dropping of the tray 10.

The stopper part 260 may include a stopper member 261, and stopper moving means 262 and 263 that move the stopper member 261. The stopper member 261 may move by the stopper moving means 262 and 263 in an upward-downward direction that is the Z-axis direction. Here, the stopper moving means 262 and 263 may each include, for example, an actuator. Here, each of the stopper moving means 262 and 263 may have one side portion coupled to the stopper member 261 and the other side portion coupled to the support stage 120 so as to be rotatable upward.

A tray detection sensor S may detect the tray 10 disposed at the upper portion of the support stage 120. The tray detection sensor S may detect the tray 10 disposed at the upper portion of the support stage 120 so as to detect the position and the number of the stacked stages of the tray 10.

FIGS. 6 to 11 are conceptual views sequentially illustrating operations during usage of a stage-stacking lift according to an embodiment of the present invention.

Figure 6:
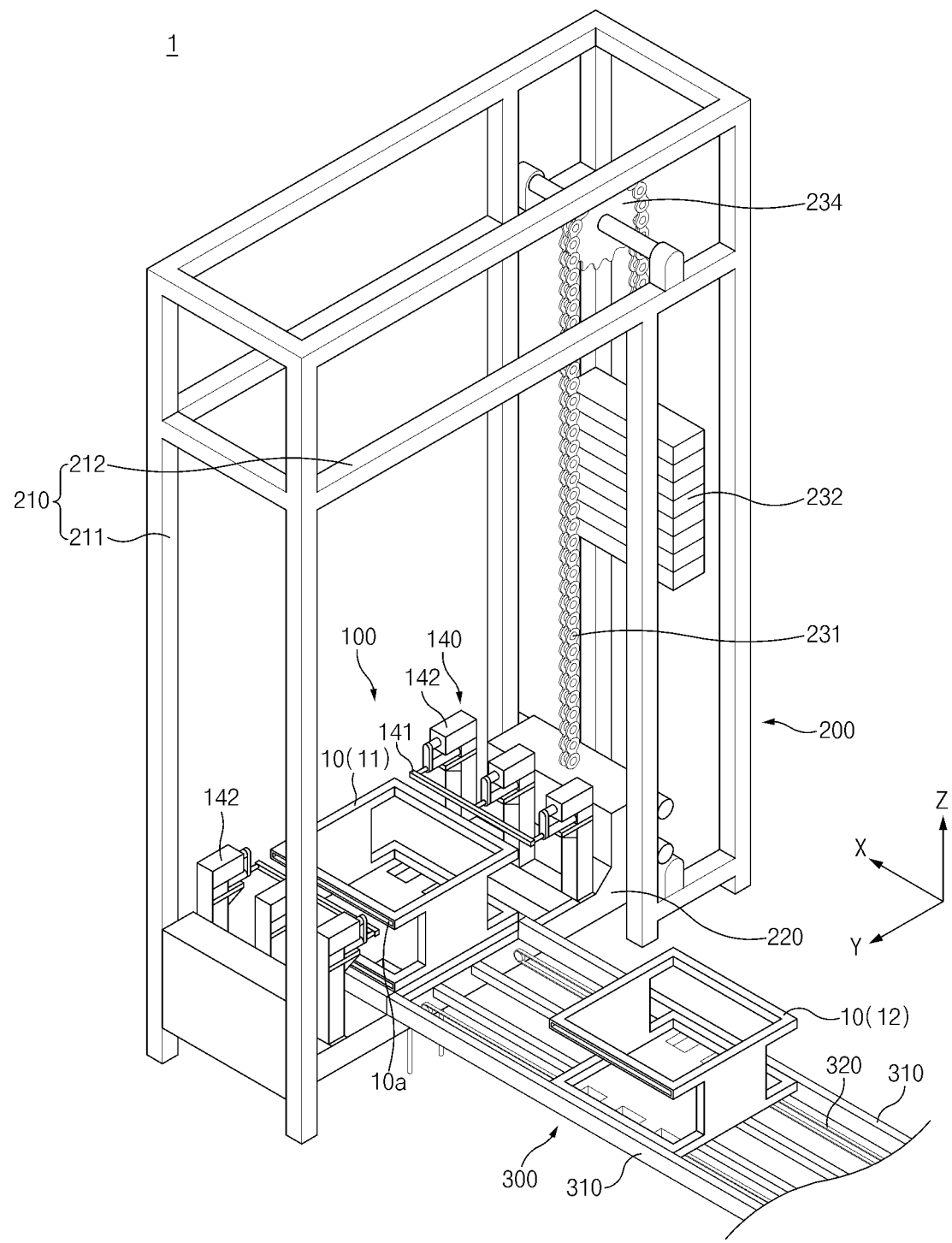
FIGS. 6 to 11 are conceptual views sequentially illustrating operations during usage of a stage-stacking lift according to an embodiment of the present invention.

Referring to FIGS. 1 and 6, a horizontally movable unit 300 may further include the horizontally movable unit 300 that moves the tray 10 in the X-axis direction that is a horizontal direction.

The horizontally movable unit 300 may move the tray 10 to the upper portion of the support stage 120.

The horizontally movable unit 300 may include a guide rail 310 and a conveyor belt 320 mounted in the guide rail 310.

The tray 10 may have both side portions, each of which is seated on the conveyor belt 320 and moves along movement of the conveyor belt 320 in a lateral direction of the stage-stacking unit 100.

The controller C may be connected to each of devices of the stage-stacking lift 1 and control an operation of each of the devices. Here, the controller C may control an operation of each of the lift unit 200, the stage-stacking unit 100, and the horizontal moving unit 300.

Figure 7:
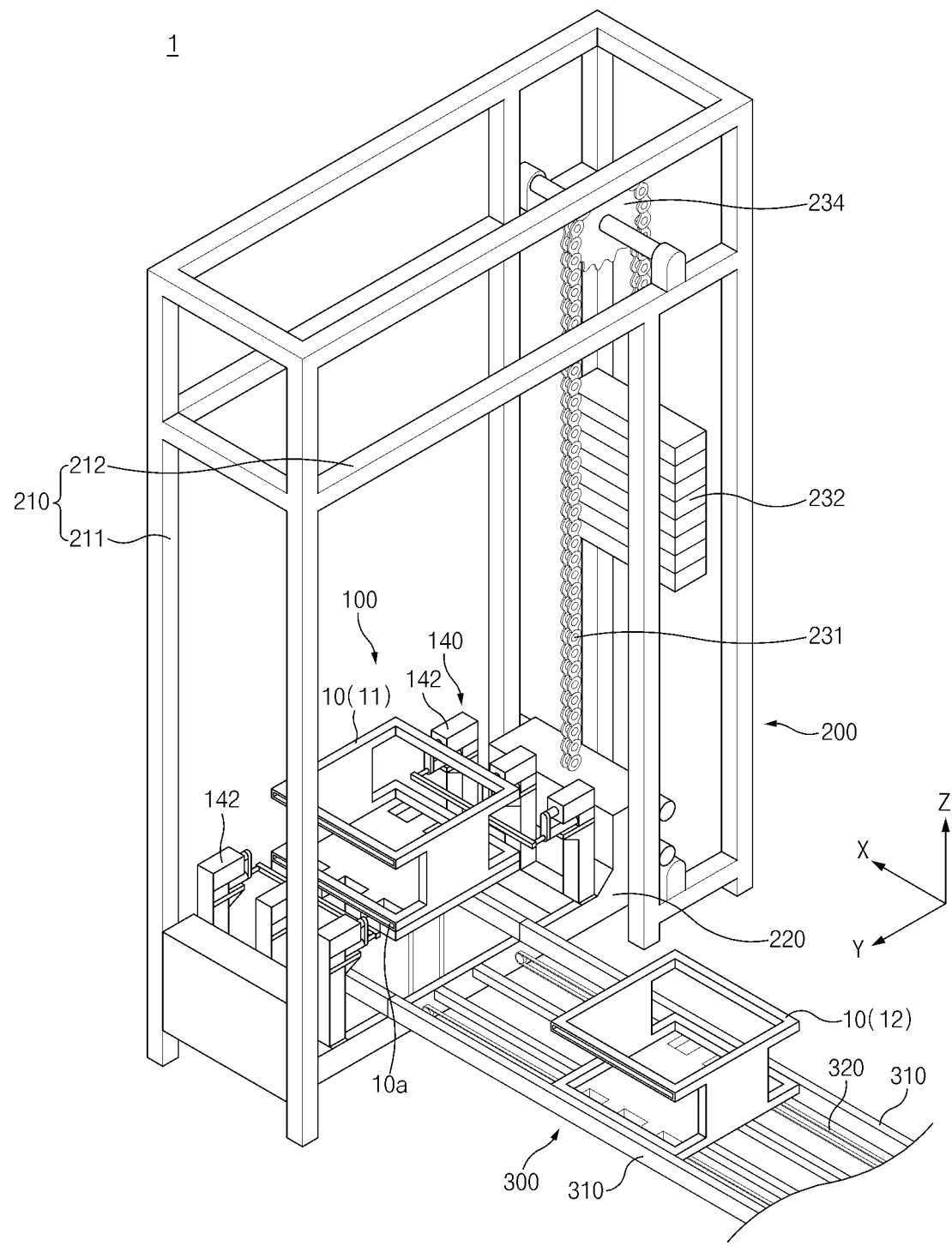
Figure 8:
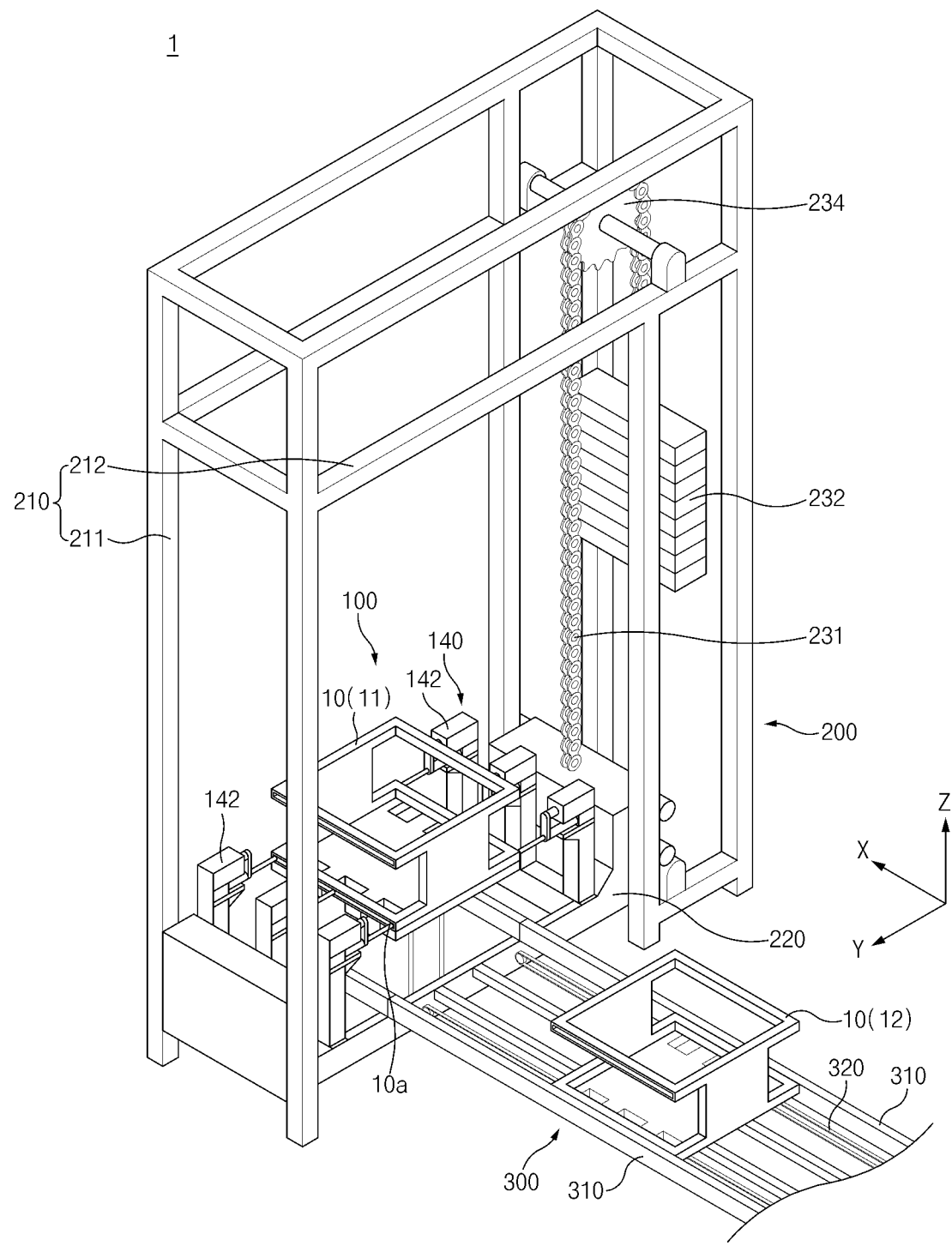
Figure 9:
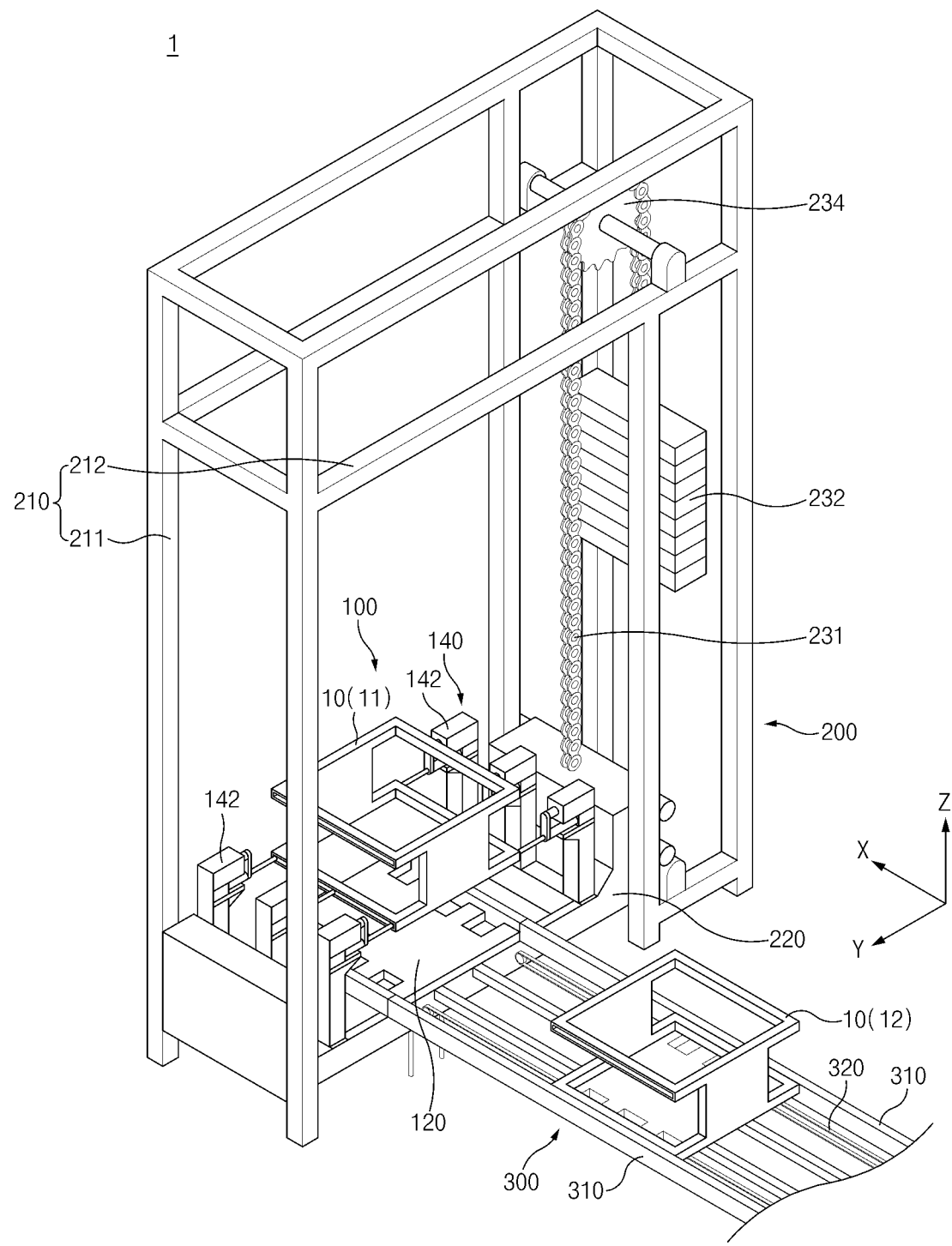
Figure 10:
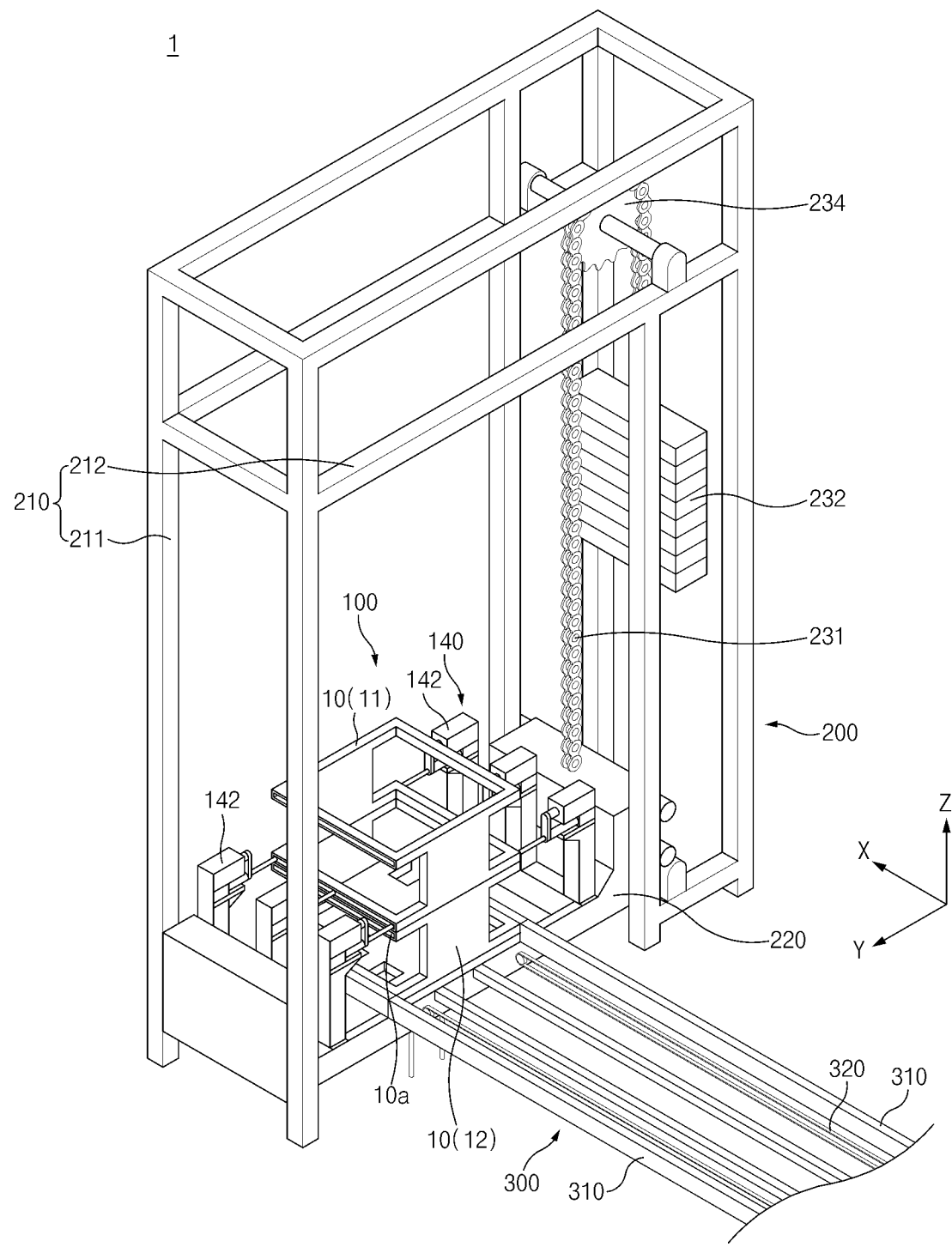
Figure 11:
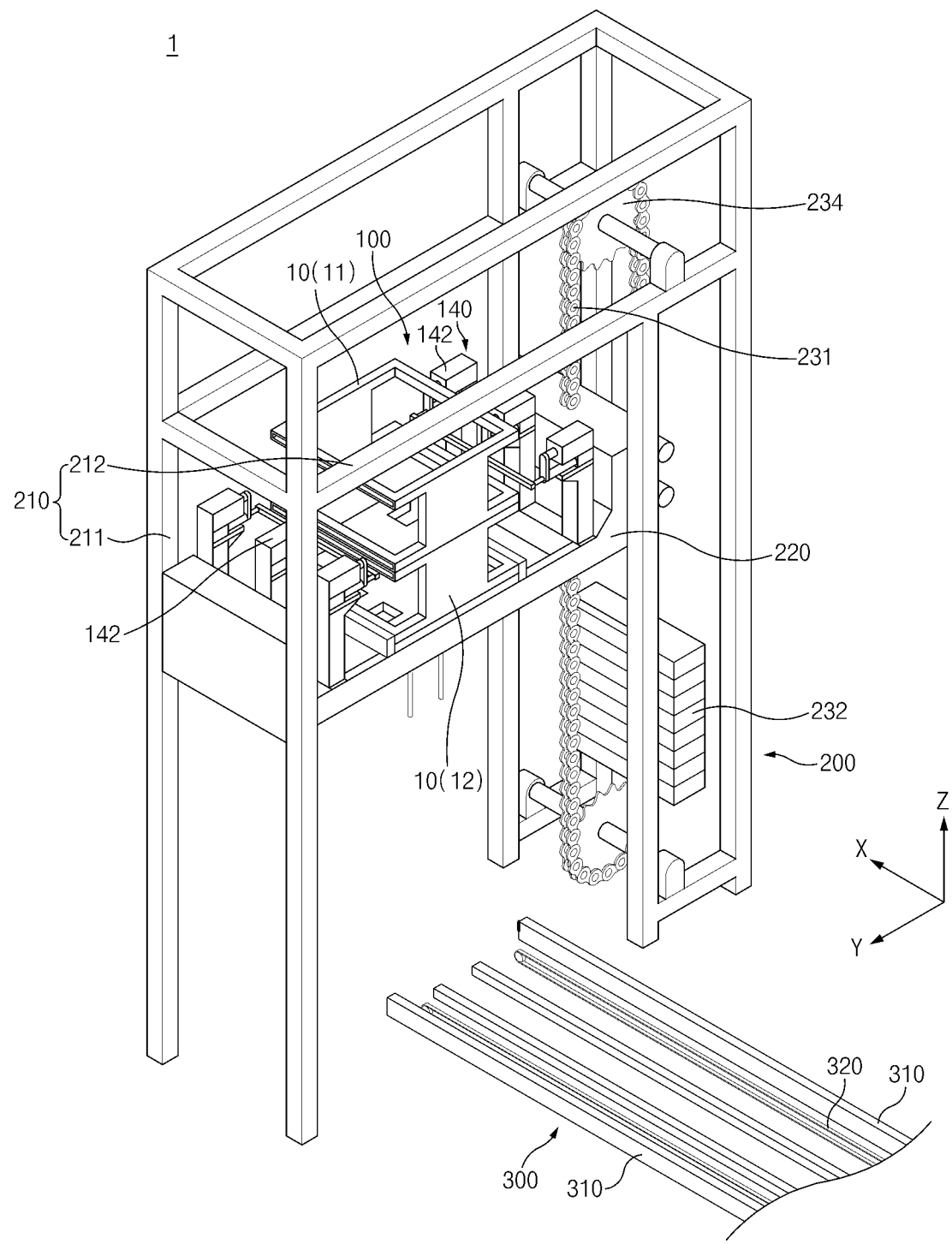

Referring to FIGS. 1 and 7, when the tray detection sensor S detects that a first tray 11 of the multiple trays 10 is disposed at the upper portion of the support stage 120, the controller C controls the vertically movable means 130 of the Z-axis movable part M so that the support stage 120 moves upward to a predetermined height. And, referring to FIGS. 1 and 8, the controller C controls the position fixing part 140 so that the position of the first tray 11 that has reached the predetermined height is fixed. Thereafter, referring to FIGS. 1 and 9, the controller C controls the vertically movable means 130 so that the support stage 120 moves to an initial position downward. And, referring to FIGS. 1 and 10, the controller C controls the horizontally movable unit 300 so that a second tray 12 of the multiple trays 10 moves to the upper portion of the support stage 120, and then, controls the Z-axis movable part M so that the second tray 12 is disposed so as to support a lower portion of the first tray 12. Accordingly, the multiple trays may be stacked in multiple stages. Thereafter, referring to FIGS. 1 and 11, the controller C may control the lift means 230 of the lift unit 200 so that the mounting stage 220, in which the stage-stacking unit 100 is mounted, moves upward.

Accordingly, the stage-stacking lift 1 according to an embodiment of the present invention configured as above is configured so that the stage-stacking unit 100 is mountable in the lift unit 200. Thus, there is an effect that a distribution equipment arrangement space may be minimized. In addition, the operation of stacking and lifting the trays 10 may become easier and the operating speed may increase.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

Moreover, the specific protective scope of the present invention will be clarified by the accompanying claims.

DESCRIPTION OF THE SYMBOLS

1: Stage-stacking lift
10: Tray
100: Stage-stacking unit
110: Stage-stacking frame
120: Support stage
130: Vertically movable means
131: Movable rod
138: Height detection sensor
140: Position fixing part
141: Fitting bar
142: Actuator
143: Connecting bar
144: Fixing part frame
200: Lift unit
210: Lift frame
220: Mounting stage
230: Lift means
300: Horizontally movable unit
C: Controller
M: Z-axis movable part
S: Tray detection sensor

The invention claimed is:

1. A stage-stacking lift comprising:
a lift unit; and
a stage-stacking unit mounted in the lift unit,
wherein the stage-stacking unit is configured to stack multiple trays therein, each tray configured to receive a respective accommodation target therein,
wherein the lift unit is configured to elevate the multiple trays together,
wherein the stage-stacking unit comprises a Z-axis movable part configured to move the multiple trays in a Z-axis direction that is a vertical direction and a position fixing part configured to fix a position of one of the trays in the vertical direction,
wherein the Z-axis movable part comprises a support stage configured to support a lower portion of the one of the trays and a vertically movable means configured to move the support stage in the vertical direction, and
wherein when the one of the trays is disposed at an upper portion of the support stage within the Z-axis movable part, the support stage is configured to move the one of the trays upward while moving upward.

2. The stage-stacking lift of claim 1, wherein the stage-stacking unit further comprises a height detection sensor configured to detect a height of the support stage in the vertical direction.

3. The stage-stacking lift of claim 1, wherein the position fixing part comprises:
   a fitting bar having an end configured to fit into a groove defined in a side surface of the one of the trays; and
   an actuator configured to move the fitting bar forward and backward with respect to a Y-axis perpendicular to the vertical direction,
   wherein when the tray moves upward in the vertical direction to a predetermined height, the actuator is configured to move the fitting bar to fit into the groove defined in the side surface of the one of the trays so as to support the one of the trays and fix a position thereof in the vertical direction.

4. The stage-stacking lift of claim 3, further comprising a tray detection sensor configured to detect the one of the trays when the one of the trays is disposed at the upper portion of the support stage.

5. The stage-stacking lift of claim 4, further comprising a horizontally movable unit configured to move the one of the trays in an X-axis direction that is a horizontal direction perpendicular to the vertical direction and perpendicular to the Y-axis, wherein the horizontally movable unit is configured to move the one of the trays to the upper portion of the support stage.

6. The stage-stacking lift of claim 5, further comprising a controller configured to control a respective operation of each of the lift unit, the stage-stacking unit, and the horizontally movable unit.

7. The stage-stacking lift of claim 6, wherein when the tray detection sensor is configured to detect that a first tray of the multiple trays is disposed at the upper portion of the support stage, the controller is configured to control the vertically movable means of the Z-axis movable part to upward to the predetermined height in the vertical direction,
   the controller is configured to control the position fixing part to fix a position of the first tray at the predetermined height, and
   the controller is configured to control the horizontally movable unit to move a second tray of the multiple trays to the upper portion of the support stage, and then to move the Z-axis movable part so that the second tray supports a lower portion of the first tray, to stack the first tray with the second tray.

8. The stage-stacking lift of claim 7, wherein the lift unit comprises:
   a mounting stage in which the stage-stacking unit is mounted; and
   a lift means configured to move the mounting stage in the vertical direction,
   wherein the mounting stage is configured such that when the mounting stage moves upward through the lift means, the one of the trays stacked in the stage-stacking unit moves upward.

9. The stage-stacking lift of claim 8, wherein the stage-stacking unit is bolt-coupled to the mounting stage by a bolt.

10. The stage-stacking lift of claim 9, wherein the lift unit further comprises a lift frame, the lift frame comprises multiple vertical frames and horizontal frames, and the mounting stage is configured to slidably move along the vertical frames using the lift means.

* * * * *